Oct. 27, 1931.  G. C. CHASE  1,829,210
AUTOMATIC CARRIAGE SHIFTING MECHANISM FOR CALCULATORS
Filed Jan. 5, 1927   12 Sheets-Sheet 1

INVENTOR
Geo. C. Chase
BY  E. W. Anderson
ATTORNEY.

Oct. 27, 1931.        G. C. CHASE        1,829,210
AUTOMATIC CARRIAGE SHIFTING MECHANISM FOR CALCULATORS
Filed Jan. 5, 1927        12 Sheets-Sheet 2

INVENTOR
Geo. C. Chase.
BY E. W. Anderson Jr.
ATTORNEY

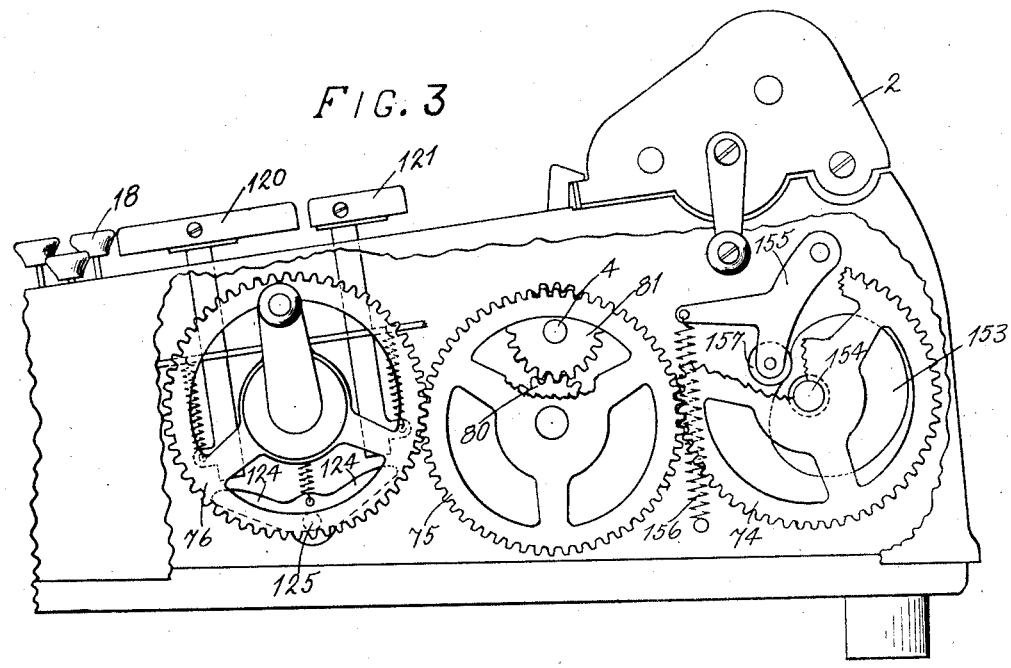

Oct. 27, 1931.  G. C. CHASE  1,829,210
AUTOMATIC CARRIAGE SHIFTING MECHANISM FOR CALCULATORS
Filed Jan. 5, 1927   12 Sheets-Sheet 4
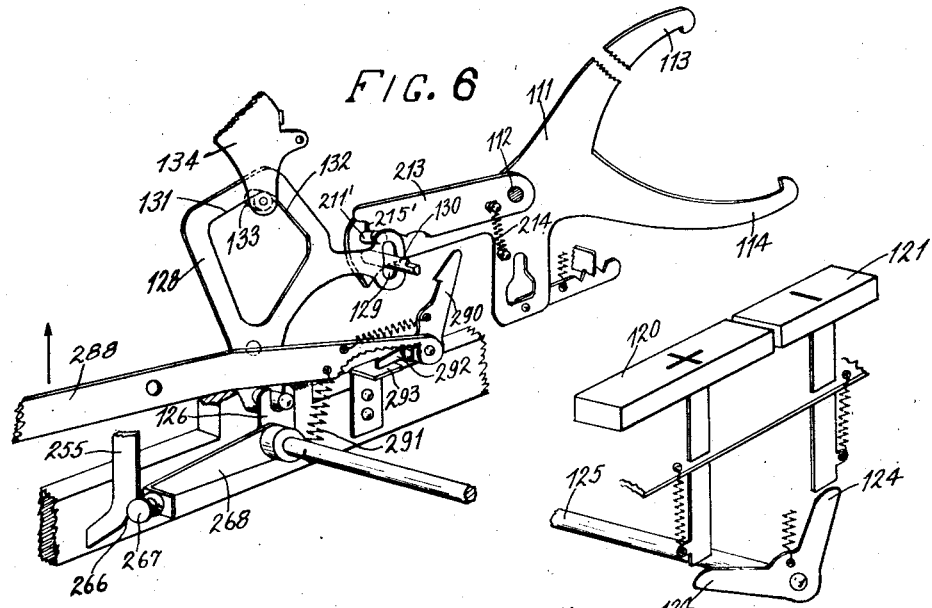
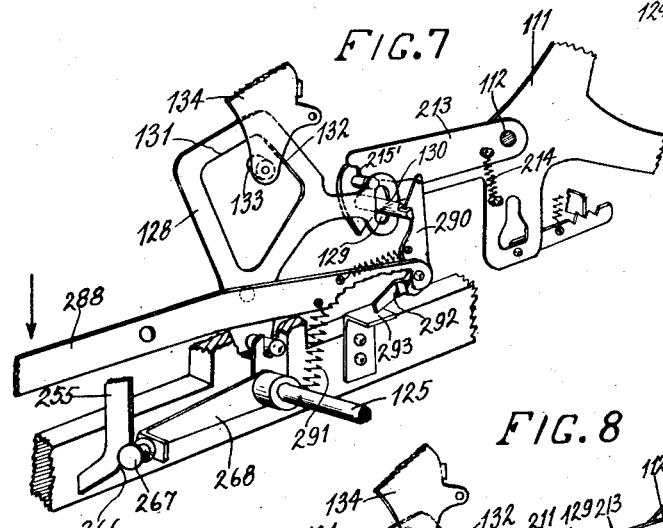
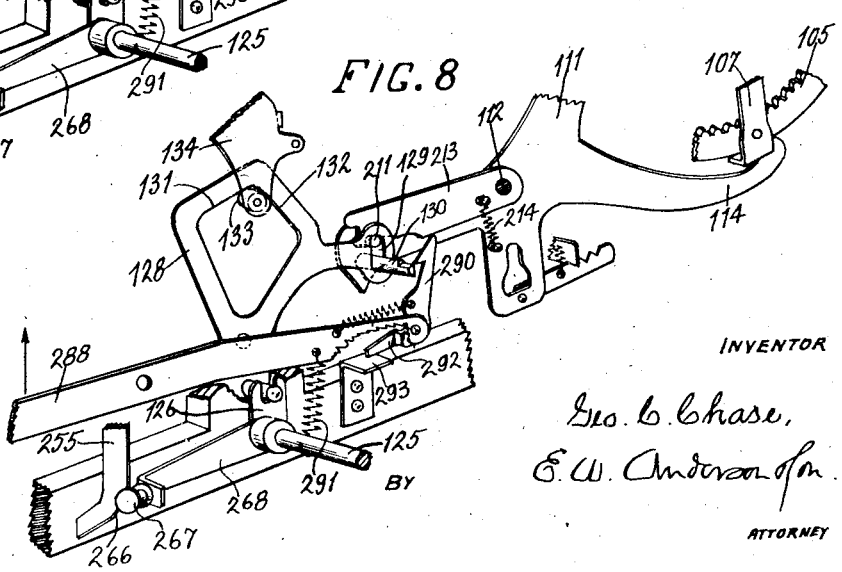

Oct. 27, 1931.  G. C. CHASE  1,829,210

AUTOMATIC CARRIAGE SHIFTING MECHANISM FOR CALCULATORS

Filed Jan. 5, 1927  12 Sheets-Sheet 5

INVENTOR
Geo. C. Chase.
E. W. Anderson
BY
ATTORNEY

Oct. 27, 1931.  G. C. CHASE  1,829,210
AUTOMATIC CARRIAGE SHIFTING MECHANISM FOR CALCULATORS
Filed Jan. 5, 1927  12 Sheets-Sheet 6

INVENTOR
Geo. C. Chase
E. W. Anderson Jr.
BY
ATTORNEY

Oct. 27, 1931. G. C. CHASE 1,829,210
AUTOMATIC CARRIAGE SHIFTING MECHANISM FOR CALCULATORS
Filed Jan. 5, 1927   12 Sheets-Sheet 7
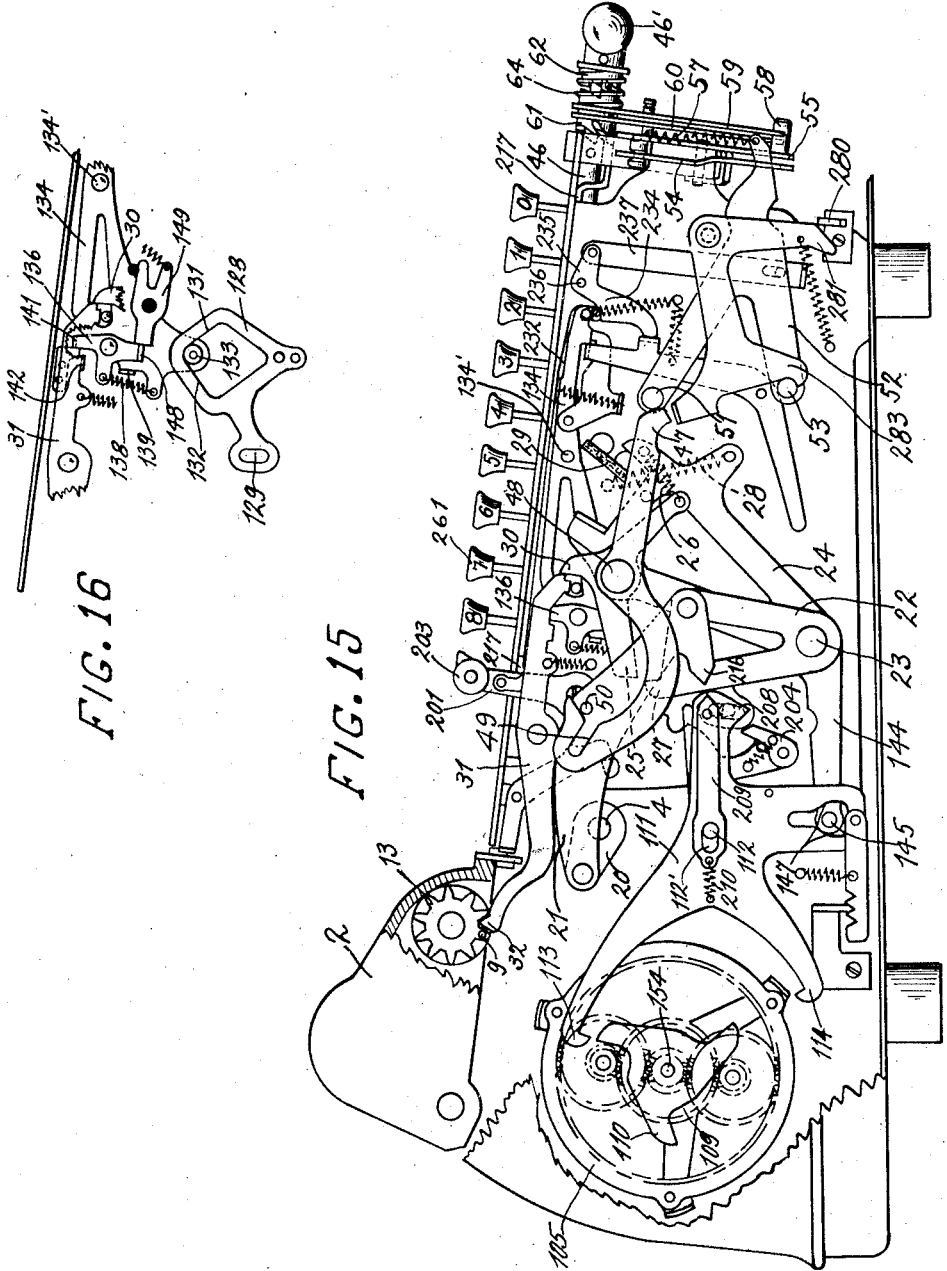
INVENTOR
Geo. C. Chase.
E. W. Anderson
BY
ATTORNEY

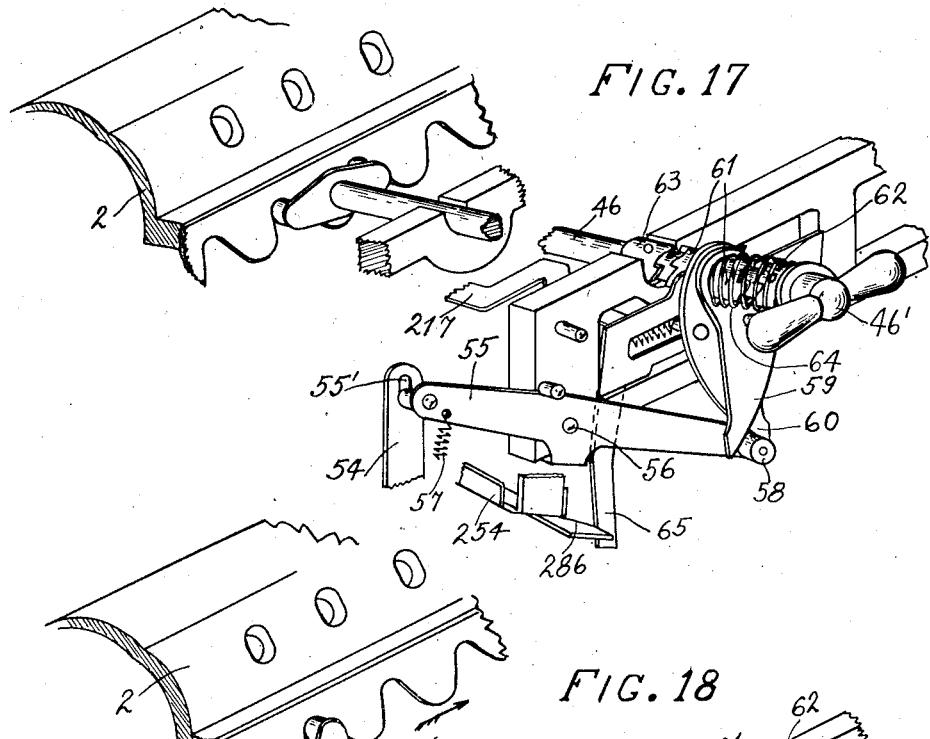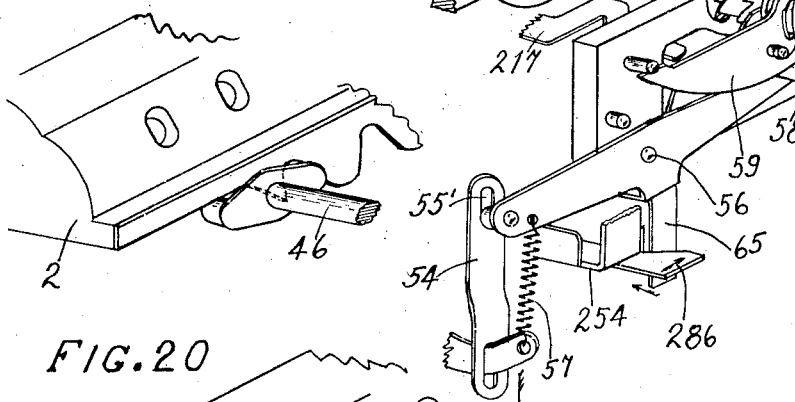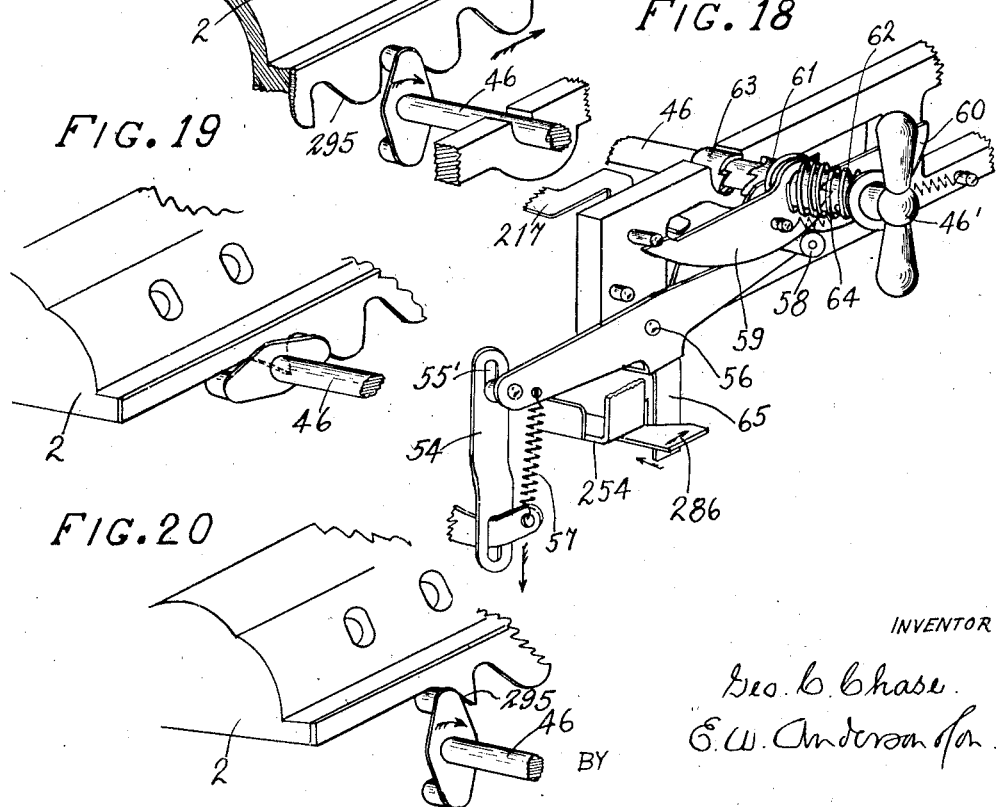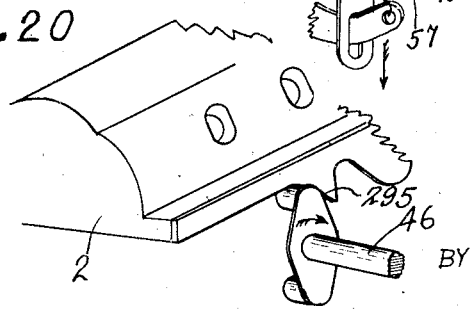

Oct. 27, 1931.  G. C. CHASE  1,829,210
AUTOMATIC CARRIAGE SHIFTING MECHANISM FOR CALCULATORS
Filed Jan. 5, 1927   12 Sheets-Sheet 9
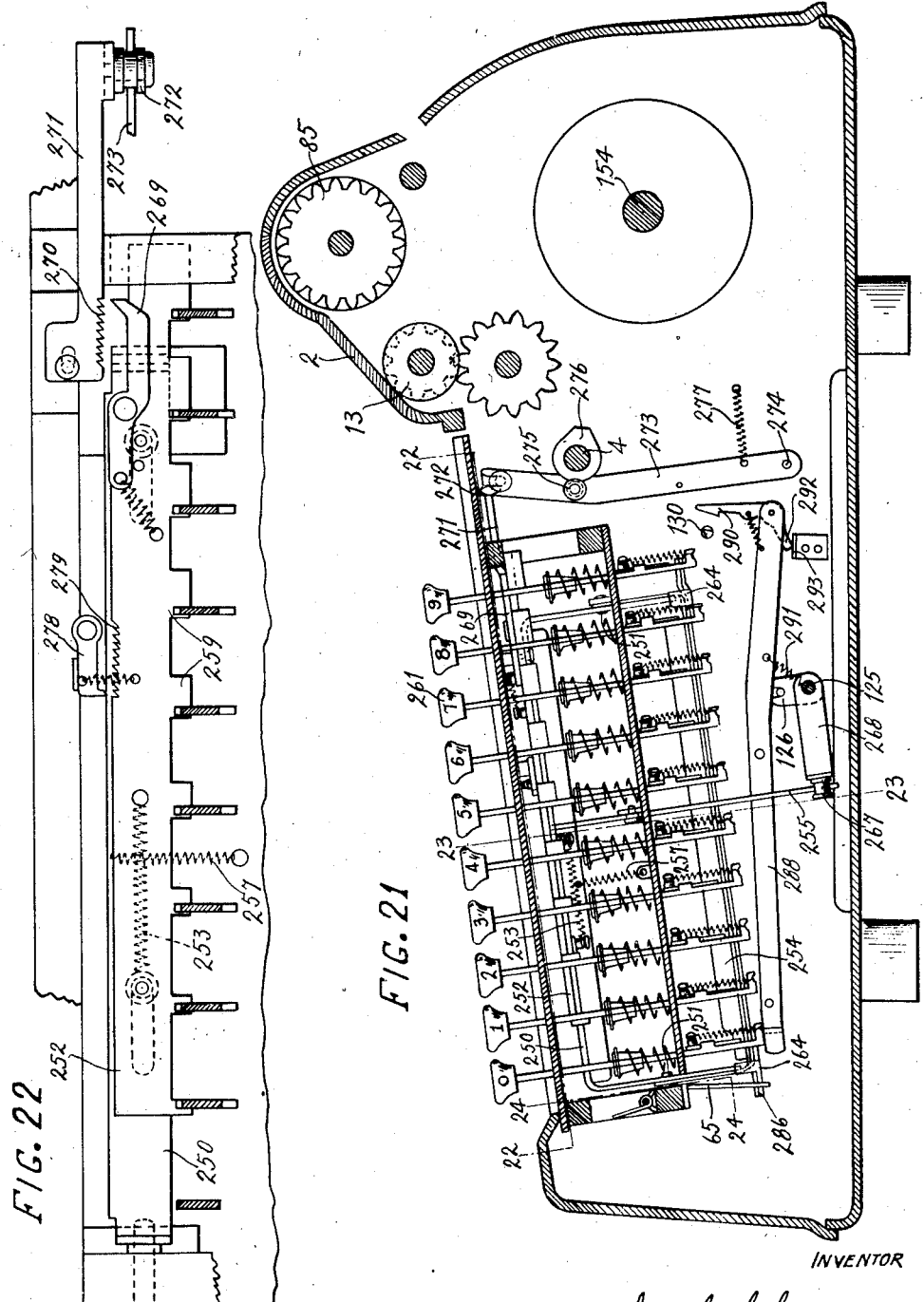
INVENTOR
Geo. C. Chase.
E. W. Anderson.
BY
ATTORNEY Oct. 27, 1931.        G. C. CHASE        1,829,210
AUTOMATIC CARRIAGE SHIFTING MECHANISM FOR CALCULATORS
Filed Jan. 5, 1927        12 Sheets-Sheet 10
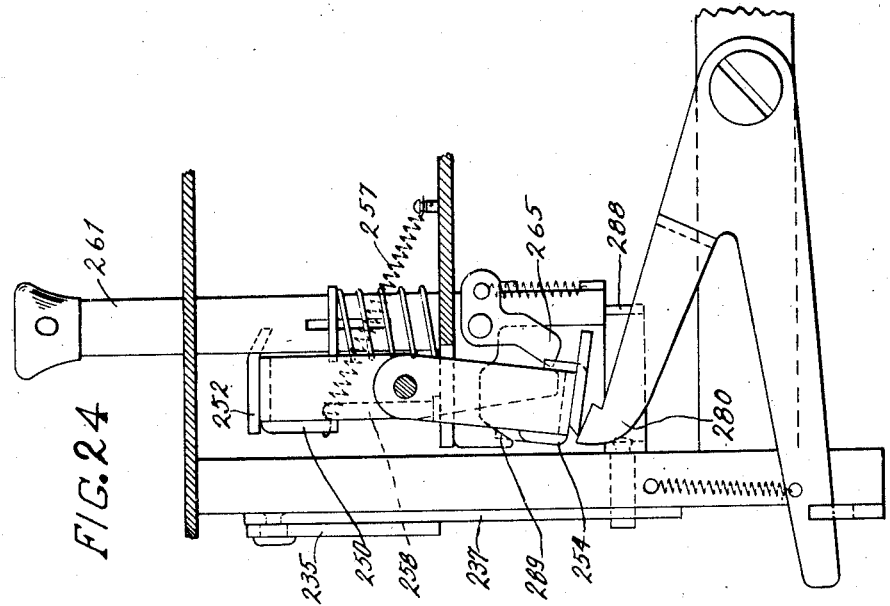
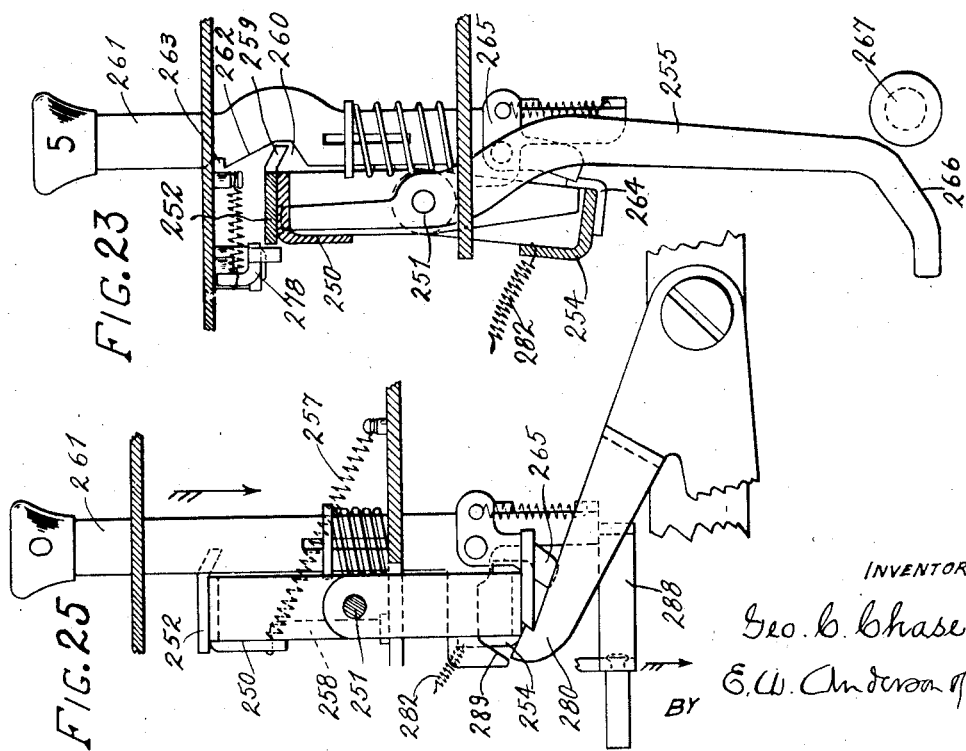
INVENTOR
Geo. C. Chase.
E. W. Anderson
BY
ATTORNEY Oct. 27, 1931.  G. C. CHASE  1,829,210
AUTOMATIC CARRIAGE SHIFTING MECHANISM FOR CALCULATORS
Filed Jan. 5, 1927  12 Sheets-Sheet 11

INVENTOR
Geo. C. Chase.
E. W. Anderson Jr.
BY
ATTORNEY

Oct. 27, 1931.  G. C. CHASE  1,829,210
AUTOMATIC CARRIAGE SHIFTING MECHANISM FOR CALCULATORS
Filed Jan. 5, 1927    12 Sheets-Sheet 12

INVENTOR
Geo. C. Chase.
E. W. Anderson Jr.
BY
ATTORNEY

Patented Oct. 27, 1931

1,829,210

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

AUTOMATIC CARRIAGE SHIFTING MECHANISM FOR CALCULATORS

Application filed January 5, 1927. Serial No. 159,155.

The invention relates to means whereby the numeral wheel carriage of a calculating machine may be automatically shifted in the performance of various arithmetical problems, having particular relation to such shifting of the carriage in multiplication and in division.

An object of the invention is the provision of carriage shifting means whereby a calculating machine is enabled to perform addition, subtraction, multiplication or division in an automatic manner and without any presetting of the machine to determine the nature of the calculation to be performed.

Another object is the provision of means whereby the machine may perform problems in multiplication or in division with or without automatic shifting of the carriage and without any presetting of the machine to determine whether or not the carriage is to be so shifted.

Another object of the invention is the provision of means for shifting the carriage in one direction in the performance of multiplication and in the opposite direction in the performance of division.

Another object of the invention is to provide improved means for shifting the carriage automatically in multiplication.

The invention consists in the novel construction and combinations of parts as set forth in the appended claims.

In the accompanying drawings, illustrating the invention:

Fig. 3 is a right hand side view with casing broken away.

Fig. 4 is a detail view of the clutching and reversing mechanism.

Fig. 5 is a detail section on line 5—5 of Fig. 4.

Fig. 6 is a perspective view of the starting mechanism.

Fig. 7 is a similar view with the 0-key clutch shifting lever depressed.

Fig. 8 is a similar view with the 0-key clutch shifting lever released.

Fig. 15 is a left hand side view of the machine with casing broken away and parts in normal position.

Fig. 16 is a detail side view of parts hidden in Fig. 15.

Fig. 17 is a perspective view of the carriage shift mechanism in normal position.

Fig. 18 is a similar view with the parts shown at the end of a key determined multiplier registration, with carriage shifted halfway.

Fig. 19 is a detail perspective view showing the carriage and shift rod in normal position when the carriage has been shifted to its extreme right hand position.

Fig. 20 is a similar view with the carriage lifted but not shifted.

Fig. 21 is a section on line 21—21 of Fig. 1 showing the multiplier mechanism.

Fig. 22 is a planular section on line 22—22 of Fig. 21 showing the multiplier selecting slide.

Fig. 23 is a detail section on line 23—23 of Fig. 21 showing a multiplier key in normal position.

Fig. 24 is a detail section on line 24—24 of Fig. 21 showing the 0-multiplier key in normal position.

Fig. 25 is a similar view showing the 0-multiplier key depressed.

Figure 1:
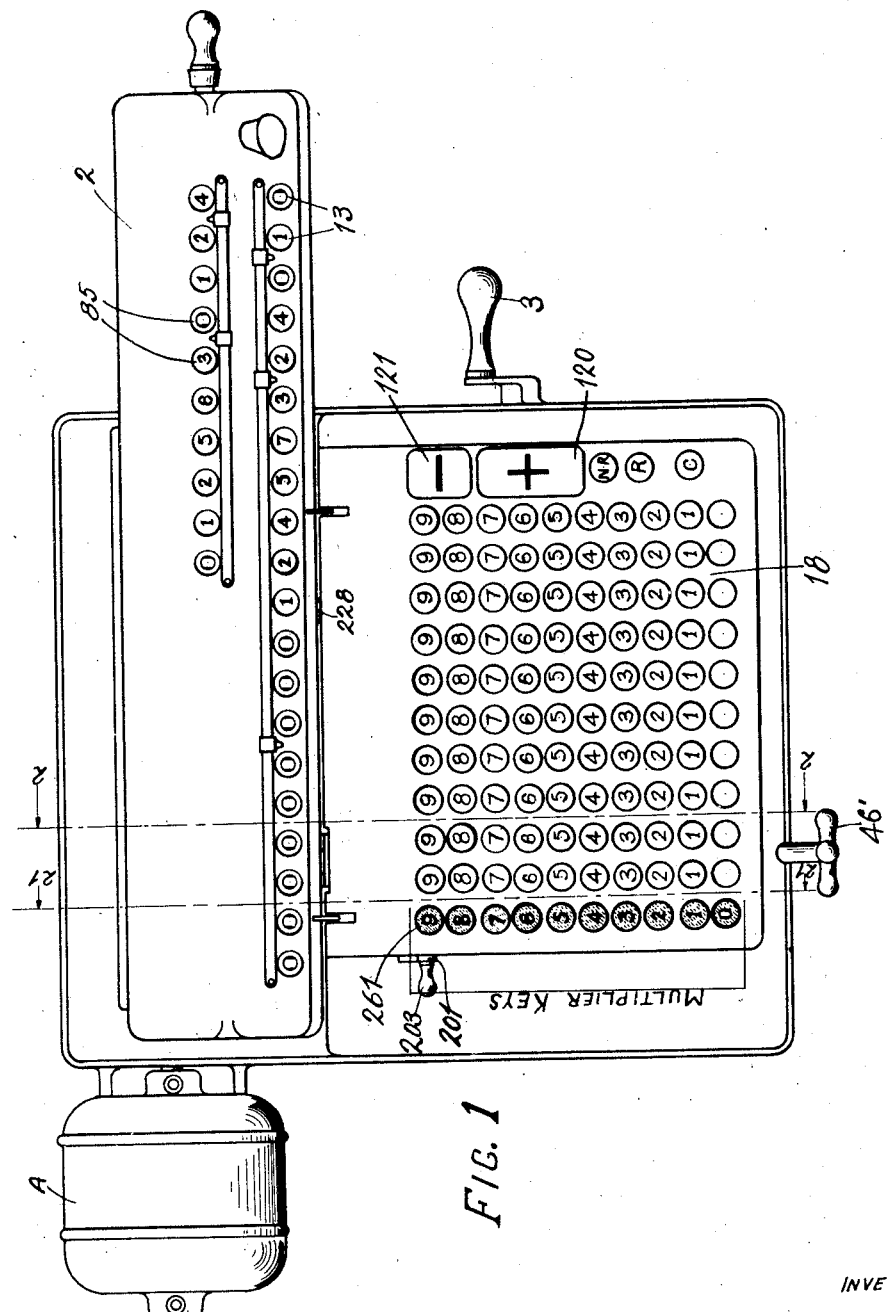
Fig. 1 is a plan view of a calculating machine embodying the invention.
Figure 2:
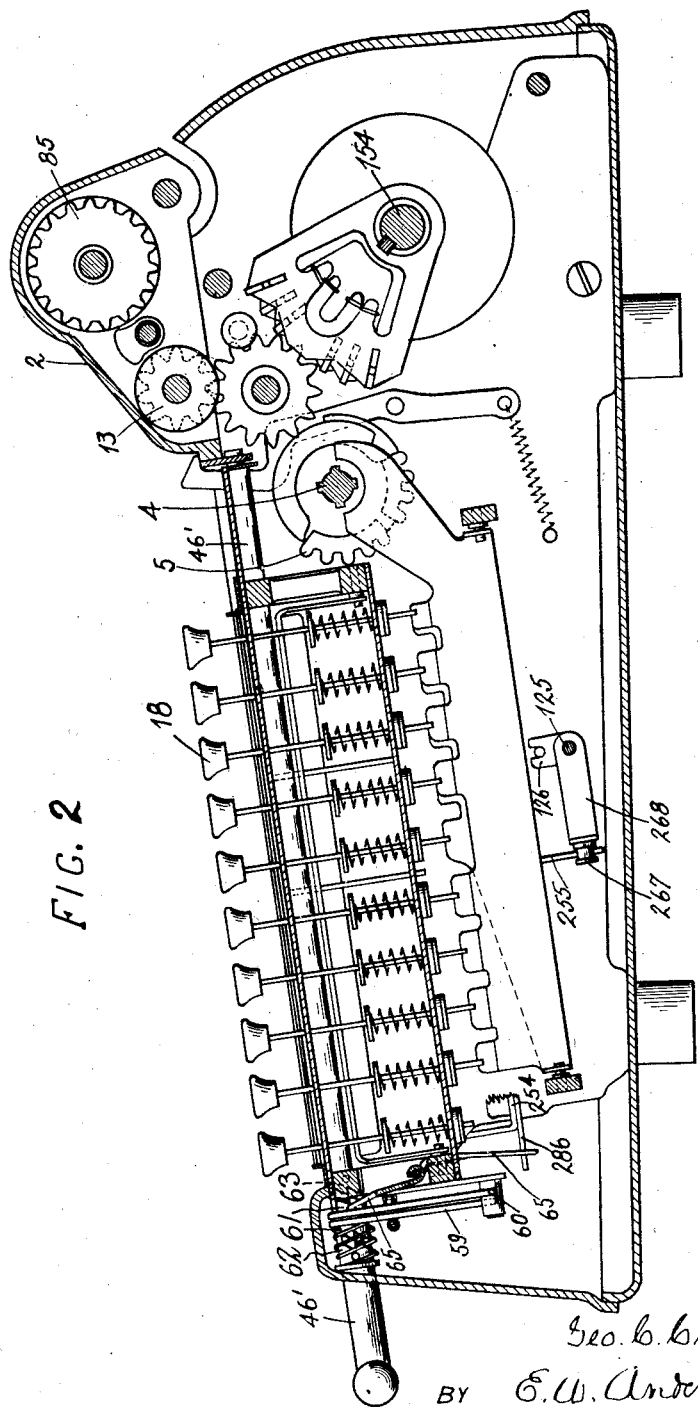
Fig. 2 is a section on line 2—2 of Fig. 1.

In these drawings the invention is shown as applied to a calculating machine constructed in accordance with the disclosure of applications of Geo. C. Chase; Serial Numbers 79,811 and 94,968; filed respectively on Jan. 7, and on March 15, 1926, the latter having issued on Sept. 18, 1928 as Patent No. 1,685,074. These Chase applications constitute a development of the calculating machine patented to F. S. Baldwin by Reissue Patents 13,841 and 13,842, as modified by the Patent No. 1,474,230, issued to E. F. Britten, Jr., Nov. 13, 1923, and by the Patent No. 1,566,650, issued to Geo. C. Chase, Dec. 22, 1925.

*Registering means.*—Figs. 1–6.

According to the present disclosure, and as more fully set forth in the Baldwin and Britten patents above referred to, amounts set up on the keyboard 18 and thereby upon the differential actuating gears 5 (Fig. 2) are registered upon numeral wheels 13 by the operation of differential gear shaft 4 and of shaft 154 whereon the tens carrying members are mounted, these shafts being connected by a train of 1-to-1 ratio gearing 74, 75, 80, 81 (Fig. 3). The hand crank 3, operating a gear 76, meshing with gear 75 of said train, is retained herein as an alternative means of operation, a motor being usually employed, as hereinafter described.

Multiplier and quotient wheels 85 may be provided, as shown in these patents, or in accordance with other well-known arrangements. The above mentioned patents also disclose the use of a transversely or ordinally shiftable carriage 2, whereon the numeral wheels 13 and 85 are mounted, and which is employed in the well-known manner in performing operations in multiplication and division. The same method of operation is of course employed where the differential actuating mechanism is shifted and the numeral wheels remain stationary, such an arrangement being a pure equivalent of that disclosed herein.

The motor driving means illustrated is substantially the same as that disclosed in the Chase patents and applications, wherein a motor A is shown in driving connection with a planetary gear mechanism, the gear members 105 and 109 of which normally rotate idly but may be selectively arrested by means of a reversing clutch lever 111, to drive the third member of a differential, connected with carry shaft 154, forwardly or reversely, respectively.

Reversing clutch lever 111 is thrown from neutral into additive or substractive clutch position by means of a transverse rock shaft 125 (Fig. 6), the direction in which this shaft is rocked to accomplish a given result being shown as opposite to that illustrated in the before mentioned Chase patent. For this reason the add key 120 and the subtract key 121 contact directly with the rock arms 124, 124 upon opposite sides of shaft 125, and setting lever 128 is pivoted to the frame eccentrically of shaft 125 and provided with a depending arm having a pin and slot engagement with a second rock arm 126 of shaft 125. The add key 120, as well as the multiplier key mechanism hereinafter described, will therefore act to rock shaft 125 in a counterclockwise direction, as viewed in Fig. 6, thereby rocking setting lever 128 in a clockwise direction, causing the wall of slot 129 in said lever 128 to contact with pin 130 of lever 111 and engage the clutch tooth of arm 114 of the latter lever with gear 105, to cause additive rotation of the numeral wheel actuator. Depression of the subtract key 121 acts to rock the parts 124, 125, 126, 128 in the opposite direction, as will be apparent from an inspection of said figure, whereby the clutch tooth of arm 113 of lever 111 is engaged with clutch member 110 of gear 109, to cause subtractive rotation of the numeral wheel actuators.

*Full cycle stopping means.*—Figs. 9–16.

Crank arm 20, upon shaft 4, has link connection 21 with rock lever 22. Arm 24 is pivoted at 23 and normally held in rearward position by spring 28, with a suitable lug thereof in contact with stop 29, and carries pivotal stop element 25, located in the plane of and normally held outside the path of movement of rock lever 22, against the tension of its spring 26 by the action of spring 28 and engagement of lug 30 of element 25 with the end of a trigger lever 31. If the forward end of lever 31 is raised out of engagement with lug 30, element 25, actuated by its spring, will drop into position to engage the free end 27 of the rock lever 22 as the latter begins its next forward stroke. Arm 24 will now move as a unit with rock lever 22, a rearward extension 144 of said arm engaging by means of a pin 145 thereof with one of the opposed cam walls 147 of reversing clutch lever 111, to bring the latter to neutral or unclutched position, (Figs. 9 and 11).

Figure 9:
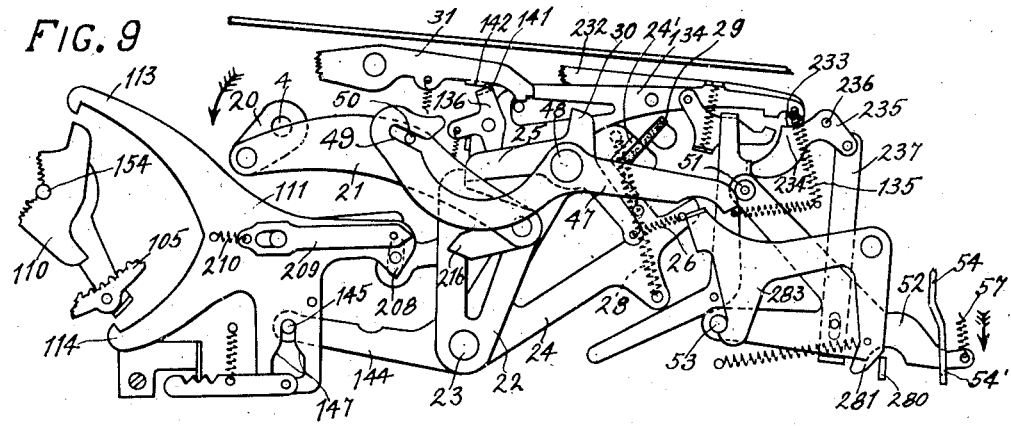
Fig. 9 is a detail side view of the stopping mechanism with carriage shift actuating levers in position assumed at the end of an additive movement.
Figure 11:
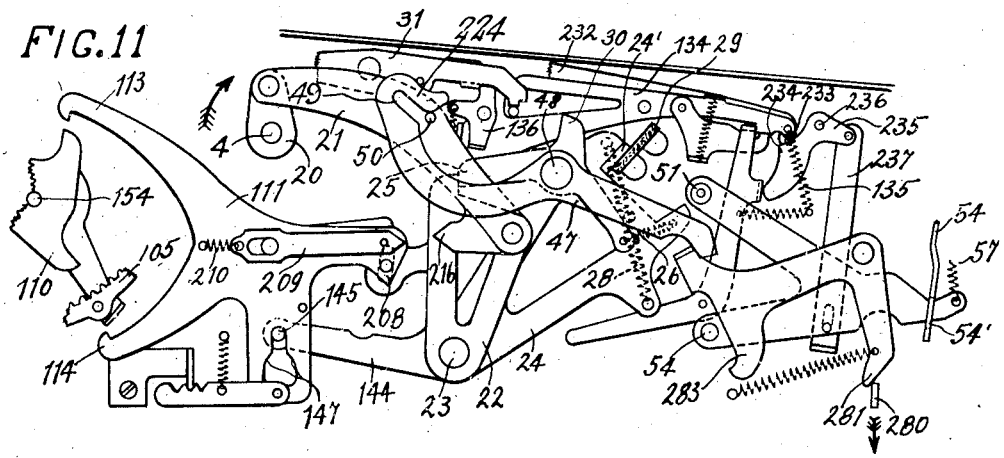
Fig. 11 is a similar view with the release lever for multiplier locking bail released at the end of the rebound.

The numeral wheel actuating means, thus freed from the action of the motor, will be brought to rest at full cycle position as follows:

Following the action of arm 24 upon lever 111, continued movement of lever 22 and arm 24 will bring lug 24' of the latter into engagement with the stop 29 as shown in Figs. 9 and 11, whereby forward movement of the parts will be arrested beyond the full cycle position whether in additive or subtractive rotation, this movement also tensioning spring 28. When, as will be hereinafter explained, the forward end of trigger lever 31 is allowed to drop into the path of movement of lug 30, the rebound of the actuating mechanism and the action of spring 28 will lift element 25 from engagement with lever 22 and leave the machine free for further operation, the actuators being located at full cycle position by means of a cam 153 upon carry shaft 154, acted upon by lever 155, spring 156 and roller 157 (Fig. 3).

In addition, subtraction and multiplication, trigger lever 31 is controlled as follows:

Setting lever 128 is provided with cam edges 131, 132, each of which may depress a roller 133 mounted upon the rear end of releasing lever 134, fulcrumed at 134' to the framing. Upon the rear end of the releasing lever is pivotally mounted releasing pawl 136, impelled by spring 138 towards stopping lug 139 of said lever. Upon depression of the add or subtract key or operation of the multiplier device, lug 141 of pawl 136 will be depressed to a position lower than lug 142 of lever 31, whereupon a spring 138 will move said pawl pivotally to bring lug 141 to position beneath lug 142 (see Figs. 12–13). Upon release of the key, releasing lever 134 will be moved by its spring 135, assisted by spring 167 of lever 165, to raise pawl 136, whereupon the contact of lug 141 with lug 142 will raise the forward end of lever 31 and trip stop element 25 to stop the machine at full cycle position (see Figs. 14 and 15).

Arm 24 of the stop mechanism is provided at its upper end with a pivoted spring tooth 149, yieldable at its free end to upward pressure and normally abutting against lug 148 of releasing pawl 136. Upon depression of pawl 136, consequent upon depression of the add or subtract or a multiplier key, lug 148 will move downwardly past tooth 149, and spring 138, moving said pawl, will bring lug 148 beneath tooth 149 (see Figs. 12–13).

Figure 10:
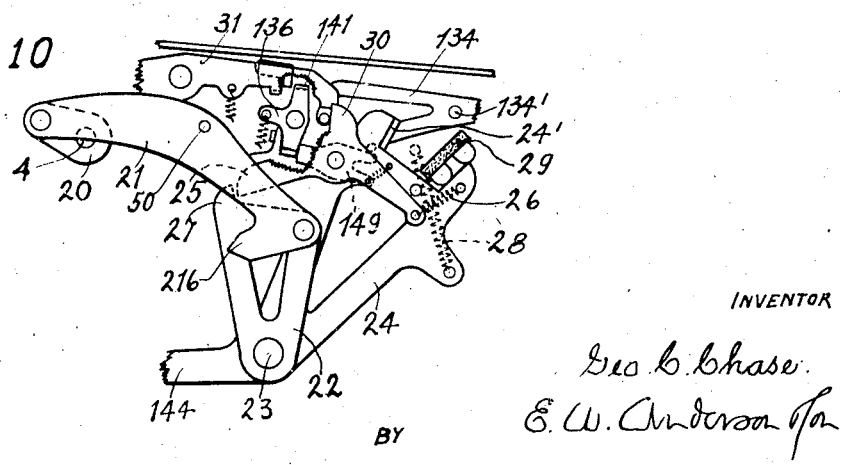
Fig. 10 is a similar view with the parts shown as returned from position of Fig. 9 to position with the driving members at full cycle or dead center position.
Figure 12:
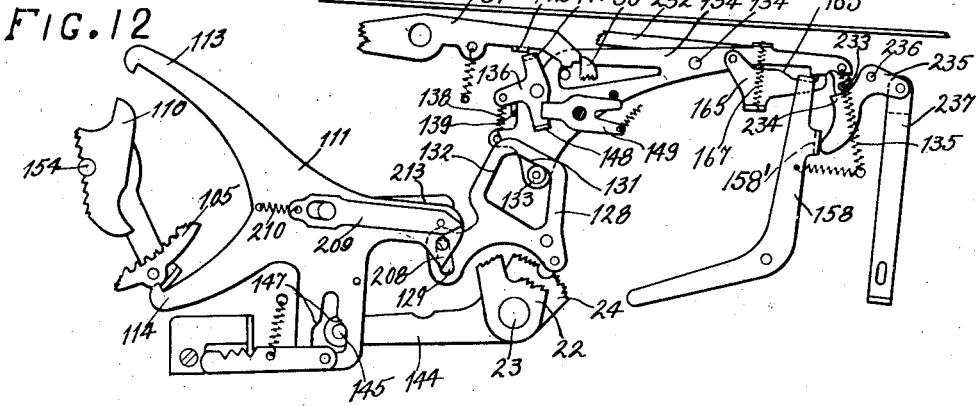
Fig. 12 is a detail side view of the stopping mechanism with parts in position taken upon depression of the add or a 1-9 multiplier key.

Upon release of the key, pawl 136 will rise and its lug 148 will raise tooth 149 against the tension of its spring (see Fig. 14), in which position it will remain until arm 24 is carried forward in the operation of the stopping means, when tooth 149 will be released and will resume a position in line with lug 148. In the rebound of the parts following contact of arm 24 with stop 29, the lug 30 of stop element 25 will pass below the forward end of trigger level 31, the latter being held in raised position by releasing pawl 136. Tooth 149 will now contact with lug 148 and move the releasing pawl to bring its lug 141 from beneath lug 142, whereupon the releasing pawl will be raised by the releasing lever spring to normal position, and lever 31 wall fall and rest upon lug 30 (Fig. 10). Stop element 25 has thus been allowed to remain in contact with rock lever 22, and link 21 moving through dead center position, the parts will be stopped a second time, should the rebound thereof be sufficient, following which stop element 25 will be restored to normal restrained position by contact of lug 30 thereof with the end of trigger lever 31, as in Fig. 15.

Division is accomplished upon this machine preferably by the method of repeated subtraction, and the determination of a quotient figure may be made automatic by means of a special control of the full-cycle stop devices, as follows:

The divisor set up on the keyboard being subtracted, by holding subtract key 121 or by operation of the mechanism controlled by division key lever 201, once more than the number of times it is contained in the corresponding portion of the dividend registered in wheels 13, a negative numeral wheel reading is obtained, the higher order numeral wheels 13 passing to a registration of nine as far to the left as carry over mechanism is provided. The carry pin $q$ of the highest order numeral wheel to receive a tens carry will lie in such relation to trigger lever 31 as to operate a cam end 32 of said lever as the wheel passes to nine (Fig. 15), thereby raising the forward end of lever 31 and releasing stop element 25, to release the clutch and stop the subtractive rotation of the actuating gears 5. In case of operation by the subtract key finger pressure must be removed from the key at this time, to avoid reengagement of the clutch, the slight upward movement imparted to the key as the clutch is disengaged serving as a signal to the operator to release the key. The wheel 85 which is being operated at the time will now register one more than the true quotient, and a corrective additive operation is performed, by depressing add key 120 or by the automatic operation of the division key devices. This will cause the carry teeth to return the wheels 13 reading nine to a zero registration, and the pin $q$ of the left hand wheel will again operate trigger lever 31 and release the stop, whereupon the operation or partial operation is completed with the proper quotient figure appearing upon wheel 85 and the proper remainder upon wheels 13.

*Carriage shifting means.*—Figs. 9 and 18–20.

The means provided for manually shifting the carriage 2 transversely of the machine are disclosed in Reissue Patent 13,842 to F. S.

Baldwin, and include a carriage shifting shaft which is herein retained and numbered 46, said shaft having a handle knob 46'. In said patent these parts formed a rigid unit and were given a half rotation clockwise or counterclockwise as viewed from the front of the machine in order to move the carriage one step to the right or left respectively.

According to the present invention means are provided to shift the carriage 2 automatically one step to the right or left in order to position the parts properly for the registration of a succeeding product or quotient figure. In relation to the operative movement of the machine this stepping of the carriage is extra-cyclic and occurs during the time that the numeral wheel actuators are moving within the limits of the idle zone, beyond their full cycle position.

For the purpose of automatically shifting the carriage shaft 46 is rotated by power derived from the motor A, transmitted through the operation of arm 24 of the full cycle stop mechanism following an additive registration.

Push rod 47 is pivoted on arm 24 at 48, and has a rear cam face 49 engaging pin 50, mounted upon the link 21, the forward end of said push rod being adapted to push forwardly against roller 51 mounted on bell-lever 52. Lever 52 is fulcrumed at 53 to the framing and at its forward end engages the slot 54' at the lower end of a link 54, the upper end of this link having a slot 55' slidably engaged by one arm of the carriage shifting lever 55, the latter being fulcrumed to the framing at 56. The forward end of bell-lever 52 has connected thereto a coil spring 57, the upper end of which connects with the free end of the same arm of the carriage shifting lever 55 engaged by said link, the spring acting to hold bell-lever 52 and carriage shifting lever 55 normally as close together as the slotted link 54 will permit.

The other or right hand arm of the carriage shifting lever 55 is provided at its free end with a roller 58, adapted to operate against right and left carriage shifting cams 59 and 60, these latter being loosely mounted on shaft 46 and having each a toothed hub clutch member 61, adapted for engagement with the teeth of the complementary opposed clutch members 62, 63 fast upon shaft 46. A coil spring 64, upon shaft 46 tends to press cams 59, 60 rearwardly, toward clutch member 63, the cams being however normally held with their toothed hubs out of engagement with the complementary clutch members by means of a pivoted plate 65 engaging at its upper edge the hub of the cam 60 and resisting the pressure of spring 64 by means of a latching device which will be described in connection with the automatic division mechanism.

It is to be noted that the cams 59 and 60 are to be distinguished not only as right and left shift members, but also as single order and plural order shift members, since the clutch hub of division cam 60 must remain in engagement with its complementary clutch member 63 with the carriage in successive ordinal positions. To provide for this latter condition, spring 64 will permit the clutch hub of cam 60 to yield and secure a ratchet movement across the teeth of clutch member 63 as the shifting lever 55 returns and allows the cam to return to normal position. Since the clutch hub of the multiplier cam 59 engages its complementary clutch member 62 only until the carriage is shifted from the initial position, no yielding is necessary, the disengagement of the clutch permitting the parts to return to normal position.

It will be observed that, clutches 61, 62, 63, being normally out of engagement, the carriage is free to be moved by means of handle knob 46', and that in this position the parts of the full cycle stopping means will not act to shift the carriage. The multiplication and division mechanism to be described includes means for engaging the clutches 62, 63, respectively, whereupon the shifting action will be accomplished as follows:—

During the movement of arm 24 of the full cycle stop mechanism from normal position to position against stop 29 at the end of an additive operation, pin 50 of link 21 encounters cam end 49 of the push rod and thereby holds the forward end of the push rod against roller 51 of the bell-lever 52, the push rod 47 moving bodily with arm 24 and operating bell-lever 52 upon its fulcrum 53 and exerting tension on one end of the spring 57 (Fig. 9.) The spring 57 in its elongation stores energy and utilizes the same more slowly in its operation of the carriage shifting lever 55. As roller 58 of the carriage shifting lever is carried upward, the cam 59 is rotated clockwise and the cam 60 is rotated counterclockwise as viewed in Fig. 18, thereby raising the carriage and advancing it about one half of its step movement (or 90°) to the right or to the left, according to the engagement of one or the other of the toothed hubs with the clutch 62 or 63. The momentum of the carriage and the force of gravity acting thereon is sufficient to complete its one step of movement.

In the above described operation of the machine, pin 145 releases reversing clutch lever 111 before arm 24 strikes stop 29. Prior to the disengagement of clutch lever 111 the carriage is being shifted directly by motive power, while after the disengagement of clutch lever 111 the carriage is being shifted indirectly by power from the motor, which has been stored in the rotating parts of the machine. Therefore, there are three distinct steps to the carriage shifting, first, the direct power of the motor, second, the fly wheel action of the rotating parts of the machine, and third, the momentum and weight of the carriage itself which completes the shifting action.

Upon the conclusion of subtractive operations the push rod 47, moving with arm 24, will be allowed to slide at its forward end under the roller 51 of bell-lever 52 and will not actuate the other shifting devices. This is due to the position taken by link 21 upon the conclusion of subtractive operations, this position being upon the opposite side of dead center and higher than the position taken upon conclusion of additive operations (see Fig. 11), whereby the rear end of the push rod is permitted to rise and its forward end to slide under roller 51 as stated.

*Multiplier mechanism.*—Figs. 21–23.

Multiplier devices are provided, which cooperate with the mechanism hereinbefore described to provide for the automatic determination of product figures and for the automatic shifting of the numeral wheel carriage.

A bail 250 pivoted to the frame at 251, operates a lever 255 which forms in effect a depending extension thereof, said bail carrying a slide 252 secured thereon by a pin and slot connection, the slide being held in rearward position by means of a spring 253. The lower ends of bail 250 are extended below the lower keyboard plate, and contact with a locking bail 254, depending from pivots 251, 251. A spring 257 holds the bail 250 and lever 255 normally in position with said bail engaging a stop 258 (Figs. 24 and 25). Slide 252 is provided with lateral spaced teeth 259, which in the normal position of the slide engage notches 260 of the stems of the multiplier keys 261 (Fig. 23). The notch 260 of each multiplier key has an upper inclined edge 262, terminating at the lower edge of a shallow notch 263. Upon depression of a multiplier key the inclined edge 262 engaging the tooth 259 of slide 252, will rock bail 250 to the left, where it will be held by engagement of tooth 259 with notch 263, in which position the multiplier key will be in its fully depressed position. The free end of bail 250 abuts against flange 264 of locking bail 254, (Fig. 21 and 23), so that as bail 250 is rocked toward the left, the bail 254 will be rocked toward the right and engaged with a spring latch 280, in which position it will lie beneath the spring pawls 265 of the multiplier keys not depressed, whereby these keys will be locked in raised position.

The rocking of bail 250 will carry an inclined edge 266 of lever 255 into contact with the roler 267, mounted at the end of an arm 268 secured to rock shaft 125, and by depressing said roller will rock the shaft in a counterlockwise direction as viewed in Fig. 21, and start the machine in rotation in an additive direction.

In order to stop the machine at the end of a number of cycles of operation determined by the multiplier key which has been depressed, the following mechanism is provided:

On slide 252 is mounted a pawl 269, which as bail 250 is rocked to the left will engage the rack teeth 270 formed in bar 271 slidably supported on the frame of the machine, and provided with a roller 272 engaged by the forked end of a lever 273 fulcrumed at 274 to the framing and bearing a roller 275 engaged by cam 276 mounted on shaft 4. The parts are held rearwardly against cam 276 by means of a spring 277.

Thus, at each rotation of each rotation of shaft 4 slide 252 will be advanced a distance corresponding to one tooth of the rack 270 and will be held in progressively advanced position by means of a spring pawl 278, pivoted to the framing, and engaged by rack teeth 279 of slide 252 when bail 250 is swung to the left upon depression of a multiplier key. The teeth 259 on slide 252 which, as stated, lock down the multiplier keys, vary in breadth, the tooth cooperating with the 1 key being adapted to be moved out of register with the key upon forward movement of slide 252 one step; the tooth cooperating with the 2 key normally extending rearwardly of the key stem a sufficient distance to register therewith until slide 252 has been moved forwardly two steps, etc., progressively until the tooth cooperating with the 9 key provides for registration until the slide has been moved nine steps. Upon release from the key, bail 250 with slide 252 returns to normal position, releasing the pawls 269 and 278 and allowing the slide 252 to return to its normal rearward position under the action of spring 253 as soon as the upward movement of the key allows the teeth 259 to pass through slot 260. Locking bail 254, however, will remain in position as secured by latch 280. The return of bail 250 to normal position also restores lever 255 to normal position, releasing roller 267 and shaft 125, whereby the actuating means will be stopped in the manner previously described.

For the purpose of bringing the carriage shifting cam 59 into engagement with the clutch member 62, in order that the carriage 2 may be shifted to the right at the completion of each multiplier figure registration, the following means are provided:

The locking bail 254 is provided with a cam extension 286, (Figs. 2, 17 and 18), which as said bail is swung to locking position contacts with an extension of the plate 65 and acts to rock the upper edge of said plate forwardly to carry the toothed hub 61 of cam 59 into clutch with member 62.

It has been stated that the shifting of the numeral wheel carriage takes place after the completion of the operative cycle of the numeral wheel actuators, and it is therefore necessary to retain bail 254 in locking position and cam 59 in clutched position after the return of bail 250 to normal. For this purpose a spring latch 280 is provided, said latch being released as follows:

The carriage having been shifted by the forward movement of rock arm 24, said arm is brought against stop 29 and the parts are allowed to rebound as previously stated until the crank connections 20, 21 having passed through dead center position, arm 24 again approaches position of contact with stop 29. During this rebound, the parts moving in a subtractive direction, pin 50 will engage a tooth 224 of push rod 47 and hold said rod in position of contact with a lever 283 (Fig. 11), so that the latter will be actuated and a cam arm 281 thereof brought against latch 280 to move the same and release locking bail 254. The locking bail, being released, is returned to normal position by spring 282 and the clutch 61, 62 disengaged by spring 64.

In order that, when the carriage has been shifted to its extreme right hand position, an idle movement of the shifting mechanism may be allowed, a cam face 295 is provided at the end of the line of shifting teeth of the carriage (Figs. 19, 20), whereby the carriage shifting shaft 46 having been given its part rotation, the carriage will be brought against the usual abutment members with said shaft in the position illustrated in Fig. 20, and as soon as the shifting impulse is checked the carriage will fall back to the position shown in Fig. 19, rotating the shaft 46 reversely to normal position.

*0 multiplier or carriage shift key.*—Figs. 7, 8, 13, 14, 21, 24 and 25.

It has been shown that the operation of the full cycle stop, when the actuators are rotating in an additive direction and the carriage shifting clutch 61, 62 or 61, 63 is engaged, will serve to shift the carriage, throw the reversing clutch lever 111 to neutral position and return the actuators from the limit of the full cycle zone and bring them to rest in full cycle position. It will also be noted that if the stop member 25 be tripped when the parts are in their normal position of rest the full cycle stop will operate without allowing the actuators to pass out of the idle zone. That is to say, extra-cyclic operation of the full cycle stopping means, instead of following the final cycle of operation will occur independently of any cyclic movement of the actuators. Obviously, under these conditions, shifting of the carriage, without registration, will take place.

Figure 13:
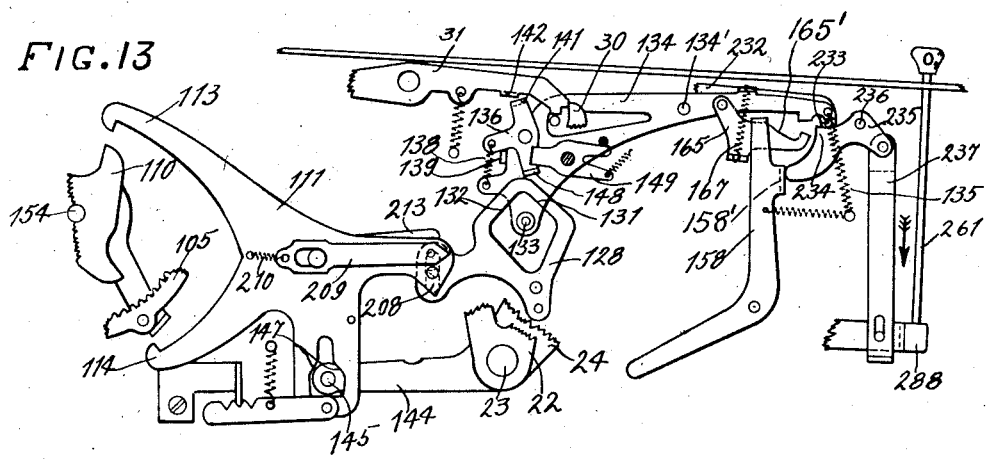
Fig. 13 is a similar view showing parts in position taken upon depression of the 0-multiplier key.
Figure 14:
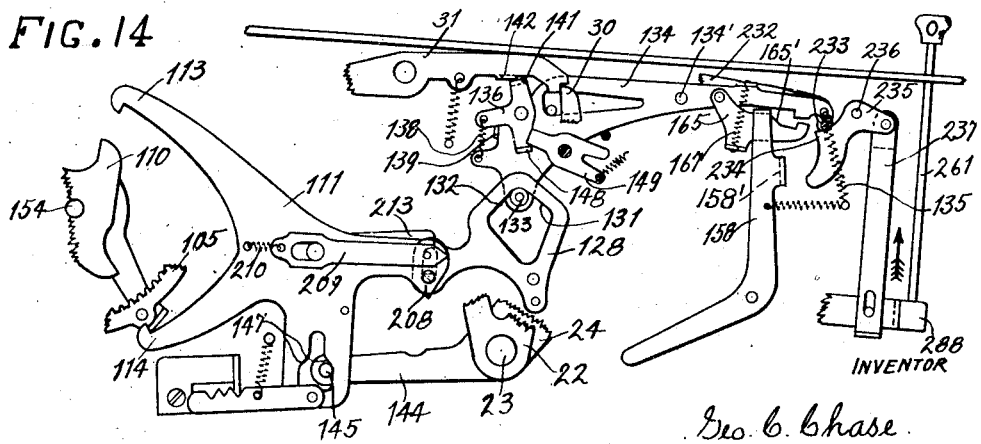
Fig. 14 is a similar view showing the parts in position taken upon the release of the add or a multiplier key.

In the present machine means are therefore provided whereby the depression of the 0 multiplier key will trip the stop element 25, throw the clutch 61, 62 into mesh, and throw the reversing clutch lever 111 into additive position. This will result in the shifting of the carriage 2 one step to the right and the stopping of the machine without registration upon the numeral wheels 13 or 85. For the purpose of tripping the stop 25 the 0 multiplier key in its depression will engage and operate a lever 288 having a pin and slot connection with a bar 237 depending from a bell-lever 235 fulcrumed at 236 on the framing, the movement of lever 288 thus serving to rock bell-lever 235 and bring a cam extension 234 thereof against a pin 233 of a pivoted bar 232, said pin contacting with and serving to transmit the movement stated to the forward arm of releasing lever 134. By this means depression of the 0 multiplier key will rock lever 134 and depress releasing pawl 136, allowing lug 141 thereof to come beneath lug 142 of trigger lever 31. (Fig. 13). Upon depression of the 0 key the free end of bell-lever 235 below cam extension 234, will contact with a lug 158' of a lever 158, and the latter by means of a terminal lug engaging the cam surface 165' of a lever 165, will tension spring 167, connecting the levers 134 and 165, so that the power of said spring will assist in tripping the trigger lever 31. The 0 multiplier key is freely retractable, and, upon removal of finger pressure therefrom, releasing pawl 136 will be allowed to rise and lug 141 contacting with lug 142 will trip the trigger lever 31 and release element 25 to secure the operation of the full cycle stop as previously explained (Fig. 14).

In order to throw the carriage shifting clutch 61, 62 into engagement the 0 multiplier key is provided with a cam face 289, adapted in the depression of the key to rock bail 254 into locking position, where it will be engaged by the latch 280 to hold the clutch 61, 62 in engagement as previously explained (Fig. 25).

In order to throw the reversing clutch lever 111 into its additive position, the lever 288, actuated by the 0 multiplier key, is provided with a spring pawl 290 upon its forward arm, said pawl in the operation of lever 238 being carried upwardly and snapped over the pin 130 of reversing clutch lever 111 (Fig. 7). Upon release of the 0 multiplier key the spring 291 will return lever 288 to normal position and the engagement of pawl 290 with pin 130 will draw reversing clutch lever 111 into additive position. As lever 288 is restored to normal position a tail arm 292 of the pawl 290 will contact with the lug 293 on the framing, and the spring 291 overcoming the pawl spring, the pawl will be thrown and held out of engagement with the pin 130, so that lever 111 may be restored to neutral position by pin 145 and cam face 147, in the operation of the stop (Fig. 8).

*Division Mechanism.*—Figs. 26–31.

In order to provide for the automatic carrying out of the process of division, according to the method previously described, means are provided whereby the setting of a key lever will start the machine in operation subtractively, and will automatically reverse the drive, from subtraction to addition and from addition to subtraction upon the occurrence of transitional carry operations, said means further acting to throw the carriage shifting clutch 61, 63 into and hold it in engagement during the operation of division.

Figure 26:
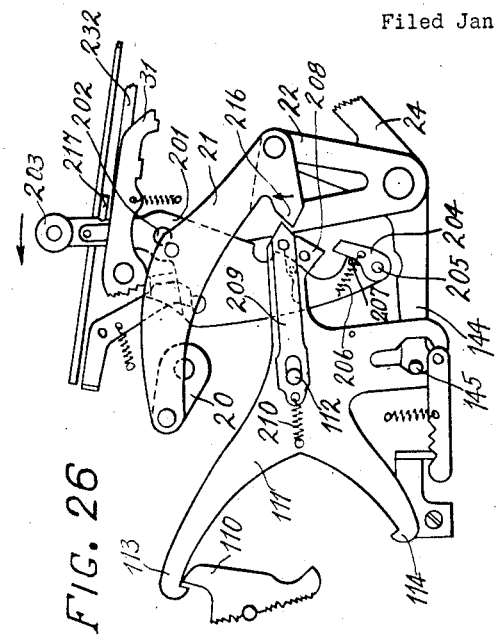
Fig. 26 is a detail side view of the automatic division mechanism with parts in position for subtractive operation.

Division key lever 201 is fulcrumed to the framing at 202 and carries at the lower end thereof pawl 204, pivoted at 205 and having spring 206 acting to hold the pawl in contact with stop 207. The forward arm of the reversing clutch lever 111 is provided at its free end with a cam edge portion 208, with which pawl 204 contacts during the setting movement of the division key, to adjust said reversing clutch lever from neutral to subtracting position, as shown in Fig. 26.

Figure 29:
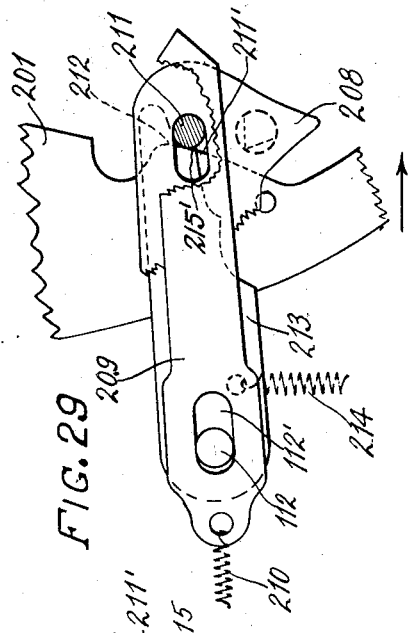
Fig. 29 is a similar view with division lever in operative position.
Figure 28:
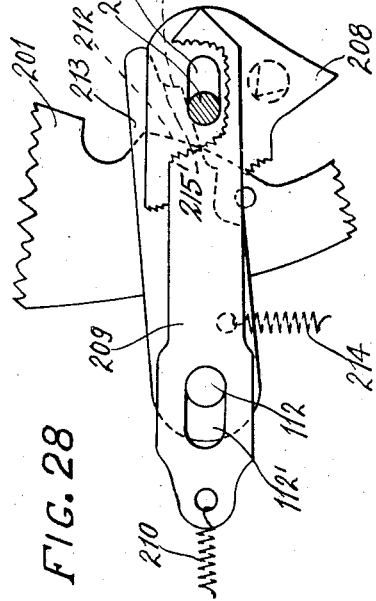
Fig. 28 is an enlarged detail view of a portion of the division lever and associated parts in normal position.

The machine having been started in operation will continue to run in a subtractive direction until a transitional carry occurs, at which time the full cycle stop mechanism will operate to bring reversing clutch lever 111 to neutral position, to carry rock arm 24 against stop 29 and to allow a rebound of the parts as previously described. During this rebound the reversing clutch lever 111 will be moved from neutral to additive position by the following means:

A pivoted, slidably adjustable tooth 209 is carried upon the forward arm of reversing clutch lever 111, by means of lateral stud 211 of said tooth engaging slot 211' of the lever and fulcrum stud 112 of the lever engaging slot 112' of the tooth. A spring 210 tends to retract tooth 209. Stud 211 engages arcuate edge 212 of the division key 201, this engagement serving upon movement of the division key 201 to operating position to move tooth 209 forwardly. Upon the side of reversing clutch lever 111 opposite tooth 209 is provided a pawl 213 the free end of which is extended to overlie the stud 211, spring 214 acting to maintain engagement of the pawl with said stud as shown in Fig. 28. Pawl 213 is provided with a notch 215, shoulder 215' of which enters into engagement with stud 211 when tooth 209 is moved forwardly by the division lever, thereby locking tooth 209 in forward position as shown in Fig. 29.

Figure 27:
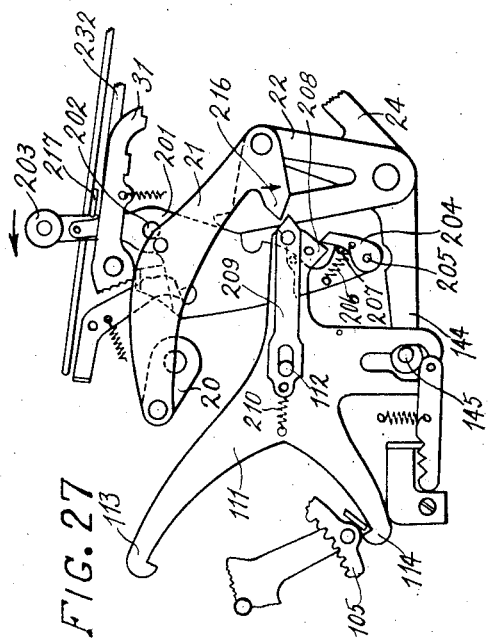
Fig. 27 is a similar view with parts in position for additive operation.

Reversing clutch lever 111 having been restored to neutral position, the rebound of the mechanism referred to will cause the projection 216 of link 21 of the stop mechanism to sweep downward and engage the forward end of the projecting tooth 209, acting thereupon to move the reversing clutch lever into additive position as shown in Fig. 27. Similarly, upon the operation of the transitional carry at the end of an additive rotation, arm 20, passing through its normal dead center position upon the rebound, projection 216 of link 21 will sweep upward, as shown in Fig. 26, engaging tooth 209 and moving the reversing clutch lever into subtractive position.

In order to accomplish the shifting of the carriage to the left by automatic means it will be sufficient to engage the clutch 61, 63, and to leave said clutch in engagement until the completion of the divisional operation, since it has been shown that the full cycle stop will operate to shift the carriage only at the end of an additive operation, whereby the shift will occur upon the completion of the repeated subtractions necessary in a given position of the carriage and the corrective additive rotation of the parts.

Figure 31:
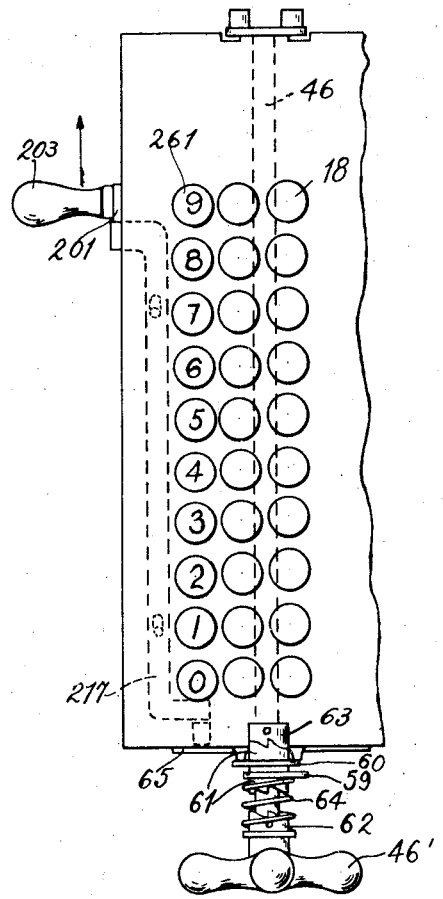
Fig. 31 is a similar view with division lever in operative position.
Figure 30:
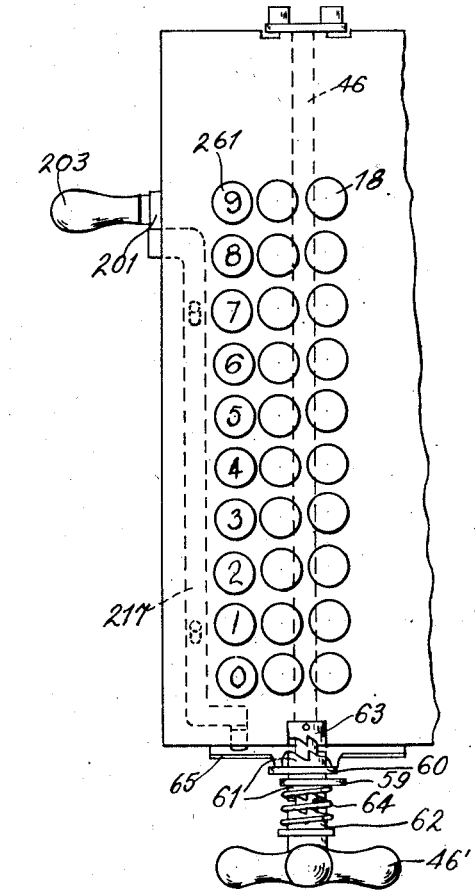
Fig. 30 is a detail plan view showing the connecting bar between the division lever and carriage shift cams with division lever in normal position.

The division key is provided with a locator rod 217 extending from the same to the pivot plate 65. In the normal position of the division key the locator rod will contact with and hold plate 65 with the clutch members 61, 63 out of engagement, with the spring 64 under tension (Fig. 30). When the division key is moved to operating position, resistance through parts 217 and 65 being removed, spring 64 will be free to effect the clutch of members 61 and 63 as shown in Fig. 31.

It will be noted that this clutch mechanism necessarily operates differently from that employed in multiplication, since the return of the divide key to inactive position will immediately disengage the clutch, and since, on the other hand, the multiplier key mechanism would hold the clutch rigidly in engagement, so that a ratchet movement would not be allowed, as required in division.

The division key is returned to normal position either manually or automatically as the numeral wheel carriage 2 reaches its extreme left hand position. In the latter case the return is accomplished by means of projection 228 of the carriage, lever 223, and tooth 230 on the division key lever. Return of the division key 201 to normal position will permit the retraction of tooth 209 whereupon the transitional carry will operate to stop the machine, rather than to reverse the operation, since the reversing clutch lever 111 will be left in neutral position, as moved by releasing stud 145 of arm 24 during the operation of the full cycle stop. This retraction of tooth 209 has been more fully described in my copending application for patent, Serial No. 79,811, hereinbefore referred to.

*Alternative methods of operation*

With the motor running idly, the machine will be in condition to perform calculations in any of the four rules and by any of the several methods of which the machine is capable, without any presetting to determine the nature of the calculation or method to be used.

In addition an amount is set up on the keyboard 18, which amount upon a momentary depression of the add key 120, is added to any amount already registered on the numeral wheels 13. In subtraction, the minuend being already upon the numeral wheels 13 or being registered thereon as in addition, the subtrahend is set up on the keyboard 18 and is subtracted from the minuend by a momentary depression of the subtract key 121.

Multiplication may be performed by holding down the add key 120 until the amount set up on the keyboard 18 has been registered upon the numeral wheels 13 a number of times corresponding to the figure of the multiplier. According to this method short cutting may be accomplished in the well known manner by adding 1 in a higher order and making the requisite subtractions in the next lower order by holding down the subtract key 121 until the subtractions are made. According to this method the carriage 2 will be shifted manually by means of the knob 46'. Alternatively, multiplication may be accomplished by setting up the multiplicand on the keyboard 18 and by manipulation of the multiplier keys 261, the carriage 2 being shifted automatically as hereinbefore explained.

The dividend being set up on numeral wheels 13 and the carriage 2 placed in proper position, division may be accomplished by one of several methods. Subtract key 121 may be held down until the estimated number of subtractions have been made, the carriage 2 being shifted manually as soon as the proper quotient figure has been obtained. Alternatively, the subtract key may be held down until a transitional carry has occurred, indicating that one too many subtractions have been made, whereupon add key 120 is momentarily depressed to correct the error and the carriage 2 manually shifted to position for calculating the next succeeding figure of the quotient. By a third method, the knob 203 of the division key lever is pressed toward the carriage 2 whereupon the automatic division mechanism is set and the entire calculation performed (including the shifting of the carriage 2) automatically.

The method to be chosen for accomplishing a calculation will depend upon the nature of the problem and upon the skill of the operator, the machine thus being in condition at all times to do the work in the most expeditious manner.

It is also to be observed that the division and multiplier keys may be employed to shift the carriage 2 automatically, either in motor or in hand operation of the machine, the quotient figures and products being automatically determined in either case.

I claim:—

1. In a calculating machine having a transversely shiftable carriage, numeral wheels mounted thereon, and reversible differential ordinal actuating means for said wheels, means operable by said actuating means in the movement thereof in a single given direction for shifting the carriage in one or alternatively in the other direction.

2. In a calculating machine having a transversely shiftable carriage, numeral wheels mounted thereon, and reversible differential ordinal actuating means for said wheels, means for shifting the carriage in one or alternatively in the other direction, including a lever operated by said actuating means, a selectively operable member carried by said lever, and a device selectively operable by said member in the movement of said actuating means in a single given direction.

3. In a calculating machine having a transversely shiftable carriage, numeral wheels thereon, and selecting mechanism including a keyboard, mechanism cyclically operable to multiply a value set up on said keyboard and to shift said carriage automatically, including a plurality of multiplier keys, a carriage shifting member, means for latching the same in active position upon depression of a multiplier key, and means having extra-cyclic operation to stop the registration and to release said carriage shifting member after the completion of the registering and shifting action.

4. In a calculating machine having a transversely shiftable carriage, numeral wheels thereon, and selecting mechanism including a keyboard, mechanism cyclically operable to multiply a value set up on said keyboard and to shift said carriage automatically, including a plurality of multiplier keys, carriage shifting means including a spring released clutch, a clutch operating member, means for latching the same in operative position upon depression of a multiplier key, and means having extra-cyclic operation to stop the registration and to release said carriage shifting member after the completion of the registering and shifting action.

5. In a calculating machine having a transversely shiftable carriage, numeral wheels thereon, and actuating means for said numeral wheels, the combination with stop means having an extra-cyclic operation to bring the actuating train to rest in full cycle position, and means controlled by said stop means for shifting the carriage, of means for imparting an extra-cyclic movement only to said actuating means and operable to accomplish a shifting of the carriage.

6. In a calculating machine having a transversely shiftable carriage, numeral wheels thereon, and actuating means for said numeral wheels, carriage shifting means including mechanism operable by the inertia of said actuating means to impart a shifting impulse and means for imparting a non-registering movement to said actuating means.

7. In a calculating machine having a transversely shiftable carriage, numeral wheels thereon, actuating means for said numeral wheels, a motor, and a clutch between said motor and said actuating means, the combination with normally inactive stop means operable to bring the actuating means to rest in full cycle position, and means controlled by the stop means for shifting said carriage including a shifting clutch, of means for engaging the first named clutch and said shifting clutch and for bringing the stop means immediately into active position.

8. In a calculating machine having a transversely shiftable carriage, numeral wheels thereon, and actuating means for said numeral wheels, means operated by said actuating means for shifting said carriage, and multiplier mechanism including digital multiplier keys controlling said carriage shifting means and a zero multiplier key controlling said carriage shifting means.

9. In a calculating machine having a transversely shiftable carriage, numeral wheels thereon, digit selecting mechanism, and driving elements including a motor, driven elements including an actuating train operable to register upon said numeral wheels amounts set up in said selecting mechanism and carriage shifting members operable thereby, a clutch between said driving and driven elements, a manually operable key, means operable upon manipulation of said key to engage the clutch and operate said carriage shifting members and cooperating means for preventing registration by said actuating train.

10. In a calculating machine having an ordinally shiftable carriage, numeral wheels thereon, actuating means for said wheels, and control means including devices for determining single order operations and devices for determining plural order operations; carriage shifting means including a selective device having a uniform movement upon the conclusion of every ordinal operation, means for adjusting said device to and for maintaining it in active position during a plural order operation, and means for adjusting said device to and for releasing it from active position during a single order operation.

11. In a calculating machine having a transversely shiftable carriage, and numeral wheels thereon multiplier mechanism and division mechanism; carriage shifting means including a driving member, a driven member, a ratchet clutch mechanism therebetween, a control device therefor operable by said multiplier mechanism, and a control device for said clutch operable by said division mechanism, one of said control devices operating to set the clutch for repeated shifting operations.

12. In a calculating machine having a transversely shiftable carriage, numeral wheels thereon and registering means for said numeral wheels including a motor and motor operation control devices; shifting means including a train of mechanism between said motor and the carriage including differential right and left shift control elements interposed in said train, and setting means for said elements operable by said control devices.

13. In a calculating machine having a transversely shiftable carriage, numeral wheels thereon, and registering means for said numeral wheels including a motor, a key adapted to set said registering means for plus operation, and a key adapted to set said registering means for minus operation; shifting means including a train of mechanism between said motor and the carriage, differential right and left shifting control elements interposed in said train, and setting means including a train of mechanism between said elements and said plus key and a train of mechanism between said elements and said minus key.

14. In a calculating machine having a transversely shiftable carriage, numeral wheels thereon and registering means for said numeral wheels, including a motor; carriage shifting means including a reciprocatory member driven from said motor, a shaft having operating connection with the carriage, control devices directly connecting said reciprocatory member and said shaft, and means for setting said control devices to effect forward alternative reverse rotation of said shaft by an impulse transmitted through said reciprocatory member.

15. In a calculating machine having a transversely shiftable carriage, reversible numeral wheels thereon, and registering means for said numeral wheels including a motor and a clutch selectively operable to determine positive or negative registration; means operable by said registering means to shift the carriage in either direction including a selective direction determining clutch, and a manual control device having operating connection with both said clutches.

16. In a calculating machine having a transversely shiftable carriage, numeral wheels thereon, actuating means for said numeral wheels, motor driving means for said actuating means a reversible manually operable carriage shifting member, and connecting means between said driving means and said shifting member, adapted to effect operation of said member to shift the carriage in one or alternatively in the other direction.

17. In a calculating machine having an ordinally shiftable carriage, numeral wheels thereon, multiplier mechanism, and division mechanism; automatic carriage shifting means, including a member cooperating with said multiplier and with said division mechanism to initiate the shift at the completion of a registration in a given order.

18. In a calculating machine having an ordinally shiftable carriage, numeral wheels thereon, multiplier mechanism, and division mechanism; automatic carriage shifting means settable to effective position and including a member cooperating with said multiplier and with said division mechanism to initiate the shift at the completion of a registration in a given order and members cooperating with and individual to the multiplier and to the division mechanism respectively and operable thereby to restore the shifting means to ineffective position.

19. In a calculating machine having a transversely shiftable carriage, numeral wheels thereon, reversible differential actuating means for said numeral wheels, multiplier mechanism, and division mechanism; automatic carriage shifting means periodically controlled by said actuating means and including devices settable by the multiplier and by the division mechanism to determine the shift.

20. In a calculating machine having a transversely shiftable carriage, numeral wheels thereon, and differential actuators for said numeral wheels; carriage shifting means including mechanism settable to operative position, a key, mechanism operable by said key to effect setting of said carriage shifting mechanism upon depression of said key and operable upon release to effect operation of said carriage shifting mechanism.

21. In a calculating machine having a transversely shiftable carriage, numeral wheels thereon, and differential actuators for said numeral wheels; carriage shifting mechanism including a device settable to operative position, a motor, a clutch, a carriage shift key, and connections for setting said settable device upon depression of said carriage shift key and for operating said clutch upon release of said key.

22. A calculating machine having a transversely shiftable carriage, numeral wheels thereon, differential actuating means for said numeral wheels, operating mechanism for said actuating means, full-cycle stop mechanism for said actuating means operable by said operating mechanism; carriage shifting means operable by said full-cycle stop mechanism including a key adapted to set said full-cycle mechanism in cooperative relation to said operating mechanism upon depression of said key and to effect operation of said operating mechanism upon release of said key.

23. In a calculating machine having a transversely shiftable carriage, numeral wheels thereon, and actuating means for said numeral wheels, means operable by said actuating means to shift the carriage, and control means including devices operable to impart a non-registering movement to said actuating means and to determine a shift of the carriage by said movement.

In testimony whereof I affix my signature.
GEORGE C. CHASE.

CERTIFICATE OF CORRECTION.

Patent No. 1,829,210.                  Granted October 27, 1931, to

GEORGE C. CHASE.

It is hereby certified that error appears in the printed specification of the above numbered patent requiring correction as follows: Page 9, line 101, claim 14, before "alternative" insert the word or; and that the said Letters Patent should be read with this correction therein that the same may conform to the record of the case in the Patent Office.

Signed and sealed this 8th day of December, A. D. 1931.

<div style="text-align: right;">
M. J. Moore,<br>
Acting Commissioner of Patents.
</div>

(Seal)